US008689020B2

(12) United States Patent
Massey et al.

(10) Patent No.: US 8,689,020 B2
(45) Date of Patent: Apr. 1, 2014

(54) METHOD, SYSTEM AND COMPUTER PROGRAM PRODUCT FOR SCHEDULING DEMAND EVENTS

(75) Inventors: Jerry Steven Massey, Lawrenceville, GA (US); James Joseph Schmid, Acworth, GA (US); Mark Joseph Meyerhofer, Acworth, GA (US); Bobby Antione Wilson, Lithia Springs, GA (US); Jaime Alberto Sierra, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 13/210,614

(22) Filed: Aug. 16, 2011

(65) Prior Publication Data
US 2013/0047010 A1   Feb. 21, 2013

(51) Int. Cl.
*G06F 1/26* (2006.01)
(52) U.S. Cl.
USPC ............................ 713/300; 700/291; 700/296
(58) Field of Classification Search
USPC ................................... 700/291, 296; 713/300
See application file for complete search history.

(56) References Cited

U.S. PATENT DOCUMENTS

| | | | |
|---|---|---|---|
| 3,602,703 A | 8/1971 | Polenz | |
| 4,464,724 A | 8/1984 | Gurr et al. | |
| 4,916,328 A | 4/1990 | Culp, III | |
| 5,414,640 A | 5/1995 | Seem | |
| 7,088,014 B2 | 8/2006 | Nierlich et al. | |
| 7,136,725 B1 | 11/2006 | Paciorek et al. | |
| 8,024,073 B2 * | 9/2011 | Imes et al. | 700/276 |
| 8,386,086 B2 | 2/2013 | Roux et al. | |
| 8,401,709 B2 | 3/2013 | Cherian et al. | |
| 8,417,391 B1 | 4/2013 | Rombouts et al. | |
| 8,457,800 B2 | 6/2013 | Marcus | |
| 8,457,802 B1 | 6/2013 | Steven et al. | |
| 8,509,954 B2 | 8/2013 | Imes et al. | |
| 8,521,337 B1 | 8/2013 | Johnson | |
| 2011/0125336 A1 * | 5/2011 | Groves et al. | 700/287 |

FOREIGN PATENT DOCUMENTS

| | | |
|---|---|---|
| EP | 2339517 A1 | 6/2011 |
| WO | 2010008479 A3 | 1/2010 |

OTHER PUBLICATIONS

Search Report and Written Opinion from corresponding EP Application No. 12180278.9-1238 dated Nov. 19, 2012.
Koch, Ed et al., "Architecture Concepts and Technical Issues for an Open, Interoperable Automated Demand Response Infrastructure", Nov. 2007.
Palensky, Peter et al., "Demand Side Management: Demand Response, Intelligent Energy Systems, and Smart Loads", vol. 7, No. 3, pp. 381-388, Aug. 10, 2011.

* cited by examiner

*Primary Examiner* — Albert Wang
(74) *Attorney, Agent, or Firm* — Fletcher Yoder, P.C.

(57) ABSTRACT

Disclosed and described herein are embodiments of systems, methods and computer program for scheduling demand events over a time period based on differences between the estimated power availability and the estimated power consumption at various points during the time period. In one aspect, methods are described. One embodiment of a method comprises establishing a defined time period, estimating power availability over the time period, estimating power consumption over the time period, and scheduling, using a computing device, demand events over the time period based on differences between the estimated power availability and the estimated power consumption at various points during the time period.

37 Claims, 7 Drawing Sheets

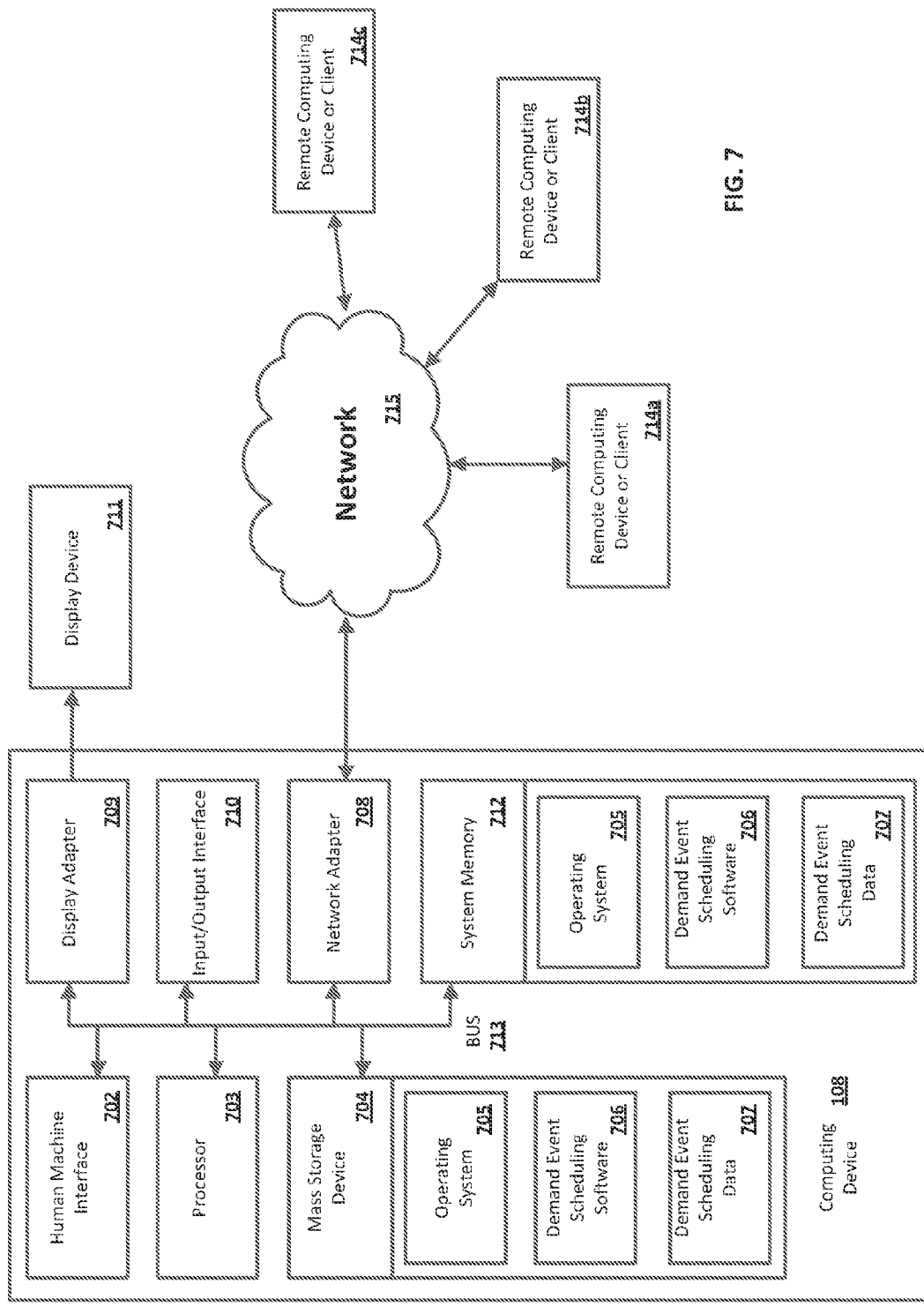

METHOD, SYSTEM AND COMPUTER PROGRAM PRODUCT FOR SCHEDULING DEMAND EVENTS

BACKGROUND OF THE INVENTION

In response to increasing fuel costs, ever-increasing costs of power generation, ever-increasing demand for energy, and safety concerns about nuclear generation, utilities are looking for alternative means to control electrical consumption. Because utilities must design their systems to provide energy to users at peak demand, which may only occur once or just a few times annually, utilities desire to reduce or "level off" peak demand. In an effort to accomplish this goal, demand response management systems (DRMSs) have been developed. Though there may be different mechanisms for accomplishing it, the primary goal of a DRMS is to allow the utility to control various appliances and/or devices, or even a consumers electrical service altogether, in a manner such that the utility can reduce its electrical demand during peak usage times. For example, the utility may be allowed to turn off certain appliances such a HVAC, an electric water heater, stove, refrigerator and the like within a customer's residence during periods of high demand. Similarly, commercial customers may allow the utility to cut off all or a part of the electrical service during periods of high demand. Generally, the utility's authorization to reduce or completely cut-off a consumer's electrical service is referred to as a demand event. These demand events are usually limited in the number that can occur oven a given time period (e.g., no more than five per month), and sometimes are limited in duration (e.g., cannot cut off HVAC for longer than two hours). Consumers can be encouraged to enroll in such programs, despite the possible inconvenience, by the utility offering a preferred rate for electricity or through other incentives.

However, effective management of these demand events such that the utility can maximize revenue from sales of off-system electrical energy or minimize costs associated with generating or acquiring electrical energy is lacking. Therefore, systems, methods and computer program products are needed that overcome challenges in the art, some of which are described herein.

BRIEF DESCRIPTION OF THE INVENTION

Disclosed and described herein are embodiments of systems, methods and computer program for scheduling demand events over a time period based on differences between the estimated power availability and the estimated power consumption at various points during the time period.

In one aspect, methods are described. One embodiment of a method comprises establishing a defined time period, estimating power availability over the time period, estimating power consumption over the time period, and scheduling, using a computing device, demand events over the time period based on differences between the estimated power availability and the estimated power consumption at various points during the time period.

In another aspect, systems are described. On embodiment of a system comprises a memory and a processor operably connected with the memory. The processor is configured to establish a defined time period; estimate power availability over the time period; estimate power consumption over the time period; and schedule demand events stored in the memory over the time period based on differences between the estimated power availability and the estimated power consumption at various points during the time period.

In yet another aspect, computer program products are described. One embodiment of a computer program product comprises computer-executable code on a non-transitory computer-readable medium. The computer-executable code is for performing the steps of establishing a defined time period; estimating power availability over the time period, wherein estimating power availability over the time period comprises estimating internal power generation controlled by a utility and estimating acquired power availability that can be purchased from sources not controlled by the utility over the time period, and wherein the internal power generation controlled by the utility includes fixed power generation and variable power generation; estimating power consumption over the time period; and scheduling, using a computing device, demand events over the time period based on differences between the estimated power availability and the estimated power consumption at various points during the time period.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 is a block diagram illustrating an exemplary operating environment for performing the disclosed methods.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
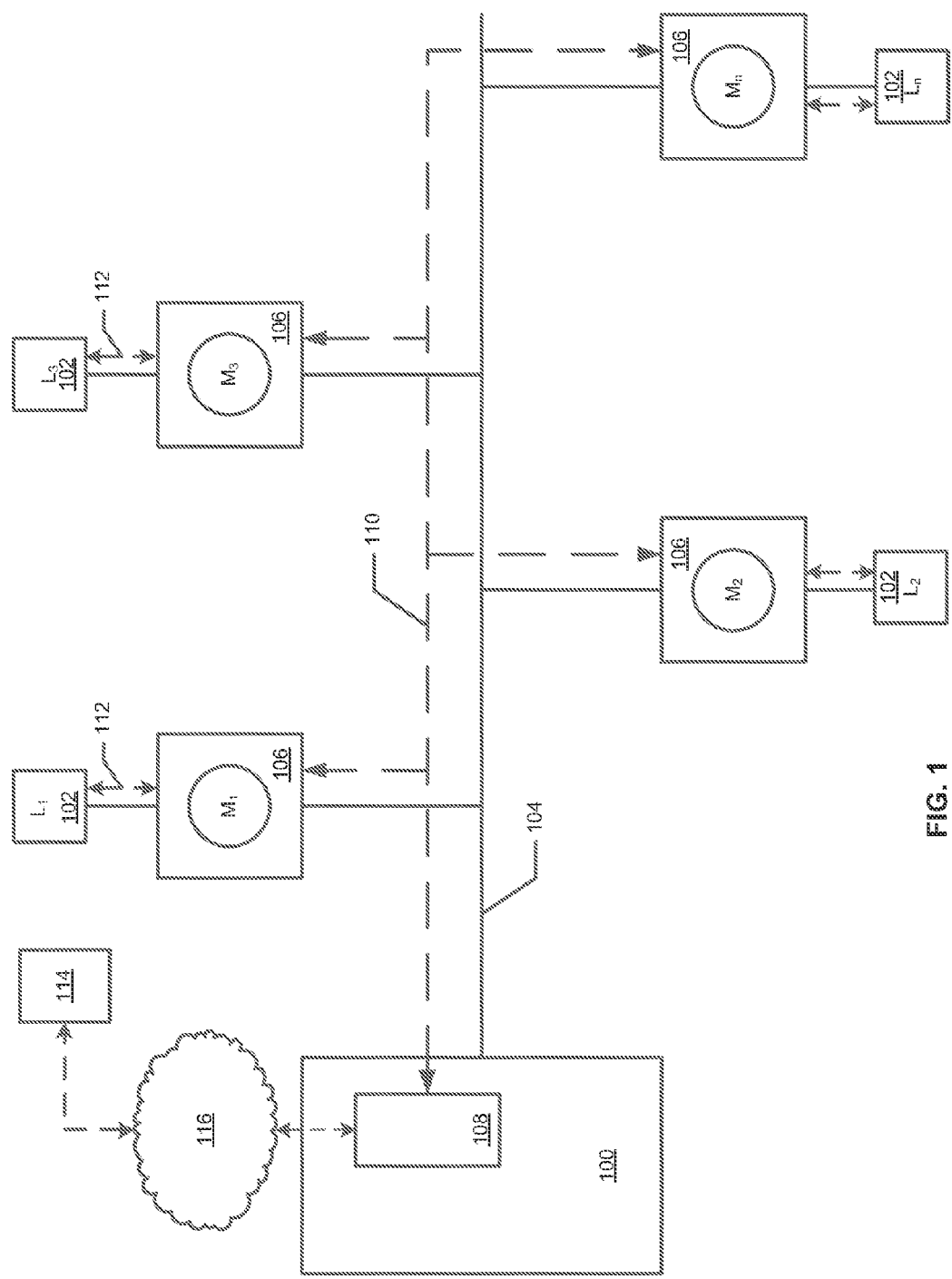
FIG. 1 is an illustration of one type of system that would benefit from embodiments of the present invention.

Referring to FIG. 1, an illustration of one type of system that would benefit from embodiments of the present invention is provided. FIG. 1 is a single-line block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided can be electric power. Though shown in FIG. 1 as a single-line diagram, it is to be appreciated that the distribution system 104 can be comprised of single-phase and/or poly-phase components and be of varying voltage levels. Consumption and demand by the loads 102 can be measured at the load locations by meters $M_1$-$M_n$ 106. If an electric meter, the meters 106 can be single-phase or poly-phase electric meters, as known to one of ordinary skill in the art, depending upon the load 102. For example, the load can be single-phase and therefore the meter 106 can be single phase. Single-phase loads can be connected to different phases (e.g., phase A, phase B or phase C) of the distribution system 104. Similarly, for example, the load 102 can be a poly-phase load such as a three-phase load and the meter 106 can be a three-phase meter that meters the three phases serving the load 102.

In one aspect, the electric meter 106 is a smart meter as described herein and as known to one of ordinary skill in the art. Hereinafter, the specification will refer to the meter 106 as a "meter," "electric meter," and/or "smart meter," where the terms can be used interchangeably. One non-limiting example of a smart meter is the GE I210+c meter as available from General Electric Company ("GE") (Schenectady, N.Y.). Another non-limiting example of a smart meter is the GE SM3000 meter as also available from GE. While consumption or demand information is used by the utility provider 100 primarily for billing the consumer, it also can be used for other purposes including planning and profiling the utility distribution system. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 can be configured to communicate with one or more computing devices 108 through a communications network 110, which can be wired, wireless or a combination of wired and wireless, as known to one of ordinary skill in the art. In one aspect, the network 110 is an advanced metering infrastructure (AMI) network. AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The network 110 between the measurement devices (e.g., meters 106) and business systems allows collection and distribution of information to customers, suppliers, utility companies and service providers. This enables these businesses to either participate in, or provide, demand response solutions, products and services. By providing information to customers, the system assists a change in energy usage from their normal consumption patterns, either in response to changes in price or as incentives designed to encourage lower energy usage use at times of peak-demand periods or higher wholesale prices or during periods of low operational systems reliability. In one aspect, the network 110 comprises at least a portion of a smart grid network. In one aspect, the network 110 utilizes one or more of one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, OpenHAN, power line carrier (PLC), broadband over power lines (BPL), and the like.

In some instances, the utility 100 desires to communicate with one or more electrical devices 102 at a metered location. In one aspect, the network 110 can be used by the utility to communicate with the one or more electrical devices 102. For example, a utility may desire to control operational characteristics of loads (e.g. electrical devices) 102 by use of a demand response management system (DRMS). An exemplary DRMS can be implemented through the use of dedicated control systems to shed loads in response to a request by a utility 100 or based upon market price conditions. Services (e.g., lights, machines, air conditioning, etc.) can be reduced according to a preplanned load prioritization scheme during the critical time frames. Generally, a DRMS can control or affect the operational characteristics of one or more electrical devices 102 found at a metered location. Such electrical devices can include, for example, one or more of a heating, ventilation and air conditioning (HVAC) unit, a water heater, lighting, a dish washer, a refrigerator, a washing machine, a dryer, an electric stove or oven, a microwave oven, and the like. In various instances, the utility 100 can communicate with the electrical devices 102 by use of network 110 that can comprise all or part of a DRMS, an AMI (as described herein), a smart-grid implementation, an Internet connection, or combinations thereof. The network 110 media can be wired (including fiber optic), wireless, or combinations thereof. In one aspect, the network 110 communicates with a meter 106, such as a smart meter, which in turn communicates 112 either wirelessly or through a wired connection with the one or more electrical devices 102 at the metered location. In other instances, the network 110 can communicate directly with the one or more electrical devices 102 using, for example, the Internet, cellular telephone, wired telephone connections, wired cable television connections, and the like.

Computing device 108, described in greater detail herein, can be used to control utility 100 functions such as meter reading, operation of the DRMS, and the like. In one aspect, computing device 108 may be connected with other systems 114 through one or more other networks 116.

Figure 2:
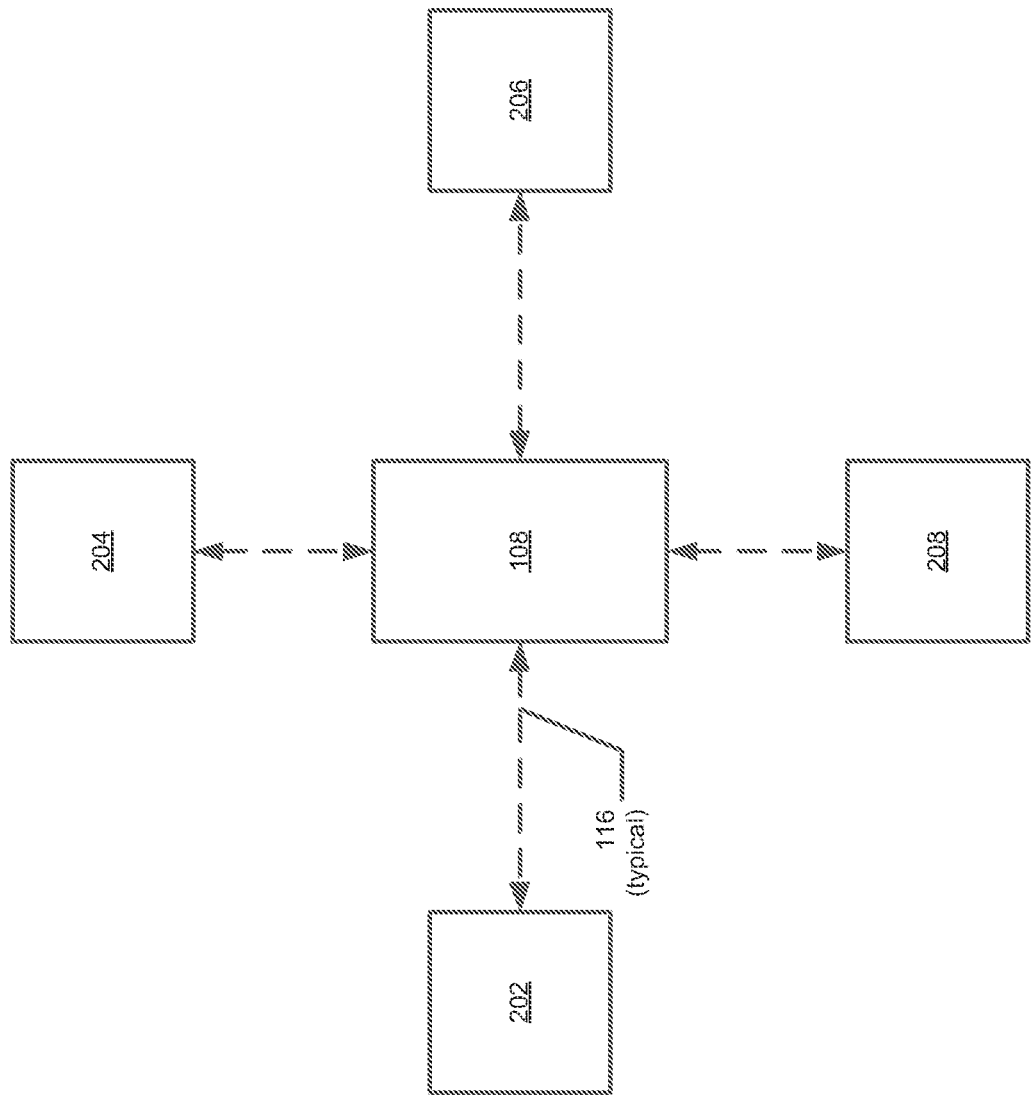
FIG. 2 is an overview block diagram of a system that can be used to implement embodiments of the present invention.

FIG. 2 is an overview block diagram of a system that can be used to implement embodiments of the present invention. For example, computing device 108, which can be used to implement aspects of the present invention, can be interconnected with or also be used to implement all or parts of one or more other systems such as, for example, a demand response management system (DRMS) 202, a load forecasting and profiling system 204 that includes individual customer usage information as well as projected usage information over a specified time period, a power generation and acquisition system 206 that estimates electrical energy that can be generated by utility-controlled resources (both fixed and variable generation), and electrical energy that can be acquired from sources not controlled by the utility over a specified time period, and a weather forecasting system 208 that provides data regarding anticipated weather events over a specified time period. Such systems, if not hosted on computing device 108, can be interconnected with computing device 108 through one or more networks 116, which can be comprised of wired (including fiber optic) or wireless media, and combinations thereof, and using any of a number of present or future-developed protocols. Information can be passed to and from computing device 108 and the various systems 202, 204, 206, 208. In other aspects, information from one or more of systems 202, 204, 206, 208 can be manually input into computing device 108 in order to facilitate implementation of embodiments of the present invention. Furthermore, computing device 108 can be interconnected with various utility devices such as meters 106 through network 110, which can be an AMI network, as described herein.

Figure 3:
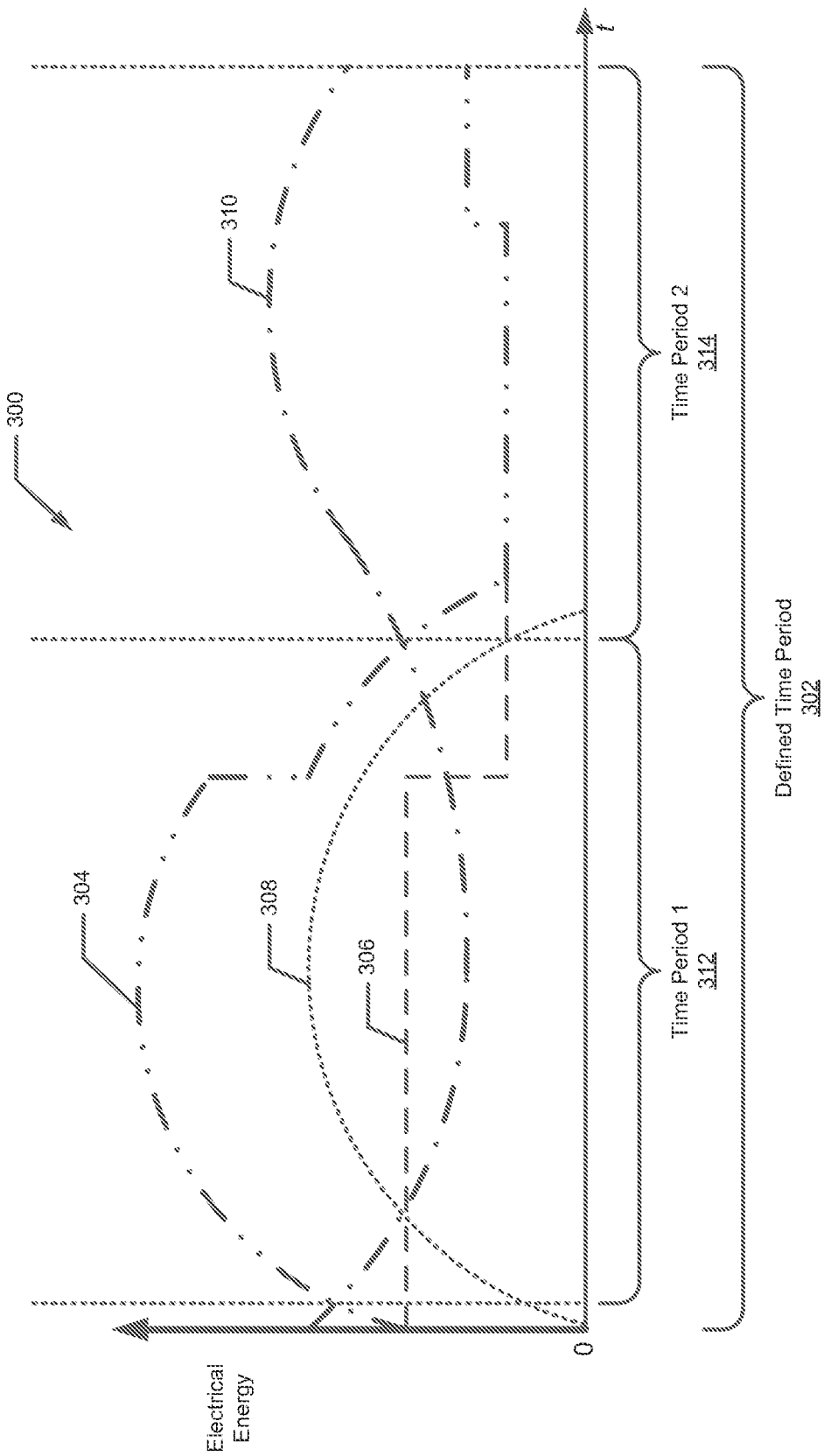
FIG. 3 is an exemplary graph illustrating a defined time period and various estimated demand and availability curves over the time period.

FIG. 3 is an exemplary graph 300 illustrating a defined time period 302 and various estimated demand and availability curves over the time period 302. The time period 302 is initially not fixed and can be set as desired. For example, the defined time period 302 can comprise establishing a time period of one hour, one day, one week, one month, one year, two years, five years, ten years, 20 years, etc., or any period of time therebetween. Estimated internal power generation 304, which includes fixed generation 306 and variable power generation 308, is illustrated in comparison to the anticipated energy demand 310 over the time period 302. In one aspect, estimating power consumption over the time period 302 comprises determining a load profile for each of a plurality of electrical power consumers over the time period 302 and aggregating the plurality of load profiles, which results in the anticipated energy demand 310. In one aspect, determining the load profiles for each of a plurality of electrical power consumers over the time period 302 comprises determining the load profiles of residential, commercial and industrial consumers of electrical power over the time period 302. In one aspect, load profile information can be obtained from a load forecasting and profiling system 204 that includes individual customer usage information as well as projected usage information over the specified time period 302. Internal power generation 304 is generally considered power generation that is under the control of the utility. Fixed generation 306 is generally generation that takes a significant amount of time to come on-line (or go off-line) and has an optimal level of generation above or below which is more expensive (and less efficient) than at the optimal level. Generally, fixed power generation 306 is designed to come on-line and stay on line for extended periods of time and generate at a relatively level output. Generally, fixed generation 306 is primarily affected by planned outages and maintenance. Fixed power generation 306 can include one or more of nuclear generation, coal-fired generation, oil-fired generation, natural-gas fired generation, and the like. Variable power generation 308 can generally be considered power generation capable of being brought on-line or off-line relatively quickly in comparison to fixed power generation 308 and may be more expensive to generate that fixed generation 308, may not be designed for continuous power generation, or may be affected by factors such as weather. Variable power generation 308 can include, for example, one or more of wind generation, solar generation, hydroelectric generation, pumped-storage generation, steam-turbine generation, combustion-turbine generation, and the like.

Not shown in FIG. 3 is total power availability over the time period 302, which includes estimated internal power generation 304 and estimated acquired power availability that can be purchased from sources not controlled by the utility over the time period 302. For exemplary purposes, it can be assumed that sufficient acquired power is available to meet any deficiency between estimated internal power generation 304 and anticipated energy demand 310 over the time period 302. In one aspect, information such as that presented in graph 300 can be obtained from a power generation and acquisition system 206, as described herein. In one aspect, information obtained from a power generation and acquisition system 206, as described herein, can include an estimated amount and an estimated cost for the fixed power generation 306 and an estimated amount and an estimated cost for the variable power generation 308. In one aspect, a weather forecast for the defined time period 302 can be used to estimate the amount and the cost of the variable power generation 308.

Further comprising the graph 300 of FIG. 3 are a first time period 312 and a second time period 314. The first time period 312 is a time period when the utility has an opportunity to sell energy as estimated internal power generation 304 exceeds anticipated energy demand 310. As shown, estimated fixed generation 306 alone exceeds anticipated energy demand 310 over a portion of the first time period 312. During the first time period 312, demand events (as described herein) can be scheduled to decrease anticipated energy demand 310 thereby increasing the amount of power that is available to the utility to sell. Otherwise, if the utility is unable to sell excess power or chooses not to sell (e.g., the selling price is too low), then the utility may generate less variable 308 and/or fixed generation 306. In the instance of fixed generation 306, this may result in inefficient generation thereby causing the per unit cost of generated energy to increase. The second time period 314 is a time period when anticipated energy demand 310 exceeds estimated internal power generation 304. In this second time period 314, the utility must acquire additional energy from sources not controlled by the utility (i.e., purchase power), use emergency sources of energy (inefficient), and/or reduce anticipated energy demand 310. The latter may be accomplished at least in part by scheduling demand events during this second period in order to reduce anticipated energy demand 310.

Therefore, as can be seen by FIG. 3, the technical effect of embodiments of the present invention is to schedule demand events over the time period 302 based on differences between the estimated power availability (which includes estimated internal power generation 304 and estimated acquired power availability that can be purchased from sources not controlled by the utility over the time period 302) and the estimated power consumption 310 at various points during the time period 302 by scheduling the demand events to maximize revenue from sales of power by the utility over the time period 310 and minimizing costs of fixed power generation 306, variable power generation 308 and acquired power generation to the utility over the time period 302.

In one aspect, an algorithm for selecting demand events for scheduling can include the steps of estimating the anticipated load reduction for each load 102. In one aspect, a base estimation is established. The base estimated can be based on factors such as building size & type, insulation, number of occupants, electrical equipment, etc. This estimation can be performed both at a meter level and also for specific devices. This estimation can be adjusted over time based on measured observations gathered during successive demand events. Typically, loads 102 can be grouped to help with the analysis needed to select which loads will be targeted for load reduction. These groups can be based on various factors including geography (such as those loads which are connected to a feeder). These groups can be loads 102 that are spread throughout the region but are controlled by owners that want to participate in a specific type of demand event (such as those that are willing to pay a higher rate during peak periods in order to receive a greater reduction in their overall bill). When events are schedule, all groups are considered individually or in combinations to determine which groups can be used to achieve a desired load reduction. In addition to the total estimated load reduction, other factors are taken into consideration such as: the number of events available during the enrollment period (events per day, week, month, etc.); the expiration date of the available demand events; whether the demand events can be used strategically to create maintenance opportunities; whether there are conflicts with other demand events that are already or anticipated to be scheduled; and the like. Once selected, the desired demand events are marked for scheduling. In one aspect, event notifications such as e-mails, text messages, phone calls, etc. are sent out to announce the demand event. For instance, these notifications may be sent to those affected by the demand event. Once selected and scheduled, at the time of the event, signals are sent out to the meters and devices to initiate the demand event in a manner that does not adversely affect the network.

In one aspect, maximizing revenue from sales of power by the utility over the time period 310 and minimizing costs of fixed power generation 306, variable power generation 308 and acquired power generation to the utility over the time period 302 comprises scheduling the demand events to maximize revenue for the utility by scheduling a sale of estimated power availability that exceeds estimated power consumption 310 and scheduling the demand events to minimize costs to the utility by minimizing purchases of acquired power generation when the cost of acquired power generation exceeds the cost of internal power generation 304 and minimizes the use of variable power generation 308 when the cost of variable power generation 308 exceeds the cost of fixed power generation 306. In one aspect, a computing device such as computing device 108 described herein can be used to schedule demand events. In one aspect, the computing device 108 can create one or more control signals for controlling the demand events over the time period 302 based on differences between the estimated power availability and the estimated power consumption 310 at various points during the time period 302. In one aspect, the computing device 108 can generate one or more reports based on scheduling the demand events over the time period 302 based on differences between the estimated power availability and the estimated power consumption 310 at various points during the time period 302. In various aspects, the one or more reports can comprise one or more of a report of a best fit use of the demand events using the internal power generation 304, a report on a best fit use of the demand events using the internal generation 304 and the acquired power availability, and a report on opportunities for the utility to sell the internal power generation 304 or the acquired power availability.

Figure 4:
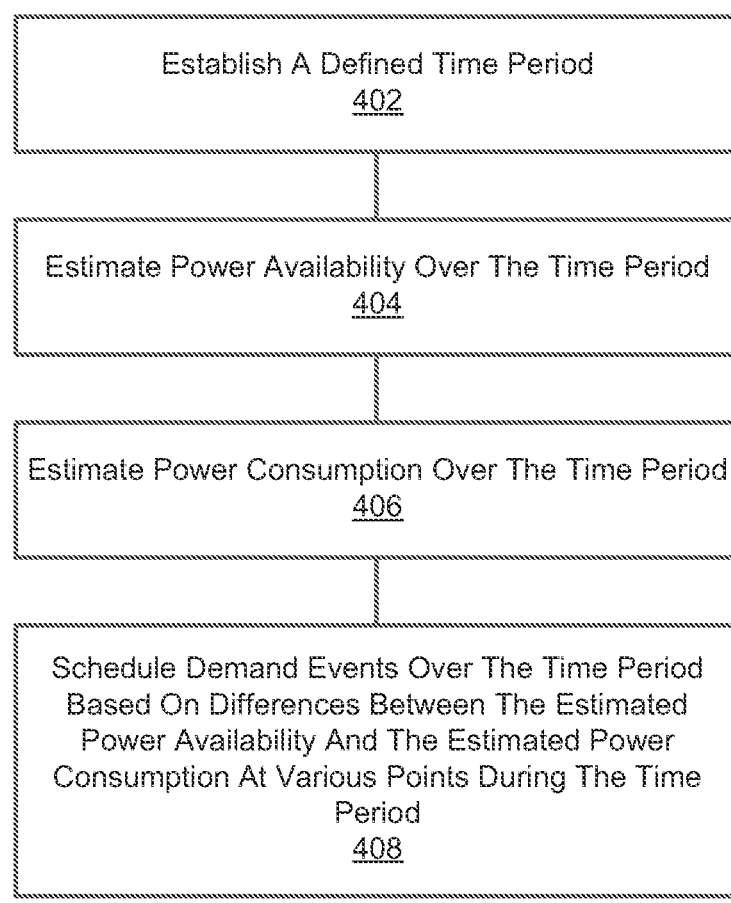
FIG. 4 is a flowchart illustrating an embodiment of a method of the present invention.

FIG. 4 is a flowchart illustrating an embodiment of a method of the present invention. As shown in FIG. 4, at step 402 a defined time period such as time period 302 is established. The time period can be of any desired duration. For example, the defined time period can be a time period of one hour, one day, one week, one month, one year, two years, five years, ten years, etc., or any period of time therebetween.

At step 404, power availability over the time period is estimated. Power availability can depend on several factors that could affect power generation including, for example, planned maintenance, likelihood of a forced outage, weather, and the like. In one aspect, estimating power availability over the time period comprises estimating internal power generation controlled by a utility and estimating acquired power availability that can be purchased from sources not controlled by the utility over the time period, wherein the internal power generation controlled by the utility includes fixed power generation and variable power generation. Estimating internal power generation controlled by the utility comprises estimating an amount and a cost for the fixed power generation and an amount and a cost for the variable power generation. In one aspect, a weather forecast for the defined time period can be used to estimate the amount and the cost of the variable power generation. Estimating acquired power availability that can be purchased from sources not controlled by the utility comprises estimating an amount and a cost for acquired power availability over the time period. Variable power generation can comprise one or more of wind generation, solar generation, hydroelectric generation, pumped-storage generation, steam-turbine generation, combustion-turbine generation, and the like. Fixed power generation can comprise one or more of nuclear generation, coal-fired generation, oil-fired generation, natural-gas fired generation, and the like.

At step 406 of FIG. 4, power consumption or anticipated demand for electrical energy is estimated over the time period. In one aspect, estimating power consumption over the time period comprises determining a load profile for each of a plurality of electrical power consumers over the time period and aggregating the plurality of load profiles. In one aspect, the load profiles are load profiles of residential, commercial and industrial consumers of electrical power that are aggregated over the time period.

At step 408, demand events are scheduled over the time period based on differences between the estimated power availability and the estimated power consumption at various points during the time period. Generally, this step is performed by a computing device such as the one described herein in accordance with an algorithm to decrease the estimated power consumption or increase the estimated power availability. In one aspect, a demand event comprises a utility having authorization to discontinue electrical power service to all or part of an electrical load of one of the plurality of electrical power consumers for a predetermined duration and scheduling demand events over the time period based on differences between the estimated power availability and the estimated power consumption at various points during the time period comprises scheduling the demand events to decrease the estimated power consumption or increase the estimated power availability. In one aspect, scheduling demand events over the time period based on differences between the estimated power availability and the estimated power consumption at various points during the time period comprises scheduling the demand events to maximize revenue from sales of power by the utility over the time period and minimizing costs of fixed power generation, variable power generation and acquired power generation to the utility over the time period. In one aspect, scheduling demand events over the time period based on differences between the estimated power availability and the estimated power consumption at various points during the time period comprises scheduling the demand events to maximize revenue for the utility by scheduling a sale of estimated power availability that exceeds estimated power consumption and scheduling the demand events to minimize costs to the utility by minimizing purchases of acquired power generation when the cost of acquired power generation exceeds the cost of internal power generation and minimizes the use of variable power generation when the cost of variable power generation exceeds the cost of fixed power generation.

In one aspect, the method described in FIG. 4 further comprises generating, by the computing device, one or more control signals for controlling the demand events over the time period based on differences between the estimated power availability and the estimated power consumption at various points during the time period. In one aspect, the computing device can generate one or more reports based on scheduling the demand events over the time period based on differences between the estimated power availability and the estimated power consumption at various points during the time period. In various aspects, the one or more reports comprise one or more of a report of a best fit use of the demand events using the internal power generation, a report on a best fit use of the demand events using the internal generation and the acquired power availability, and a report on opportunities for the utility to sell the internal power generation or the acquired power availability.

Figure 5:
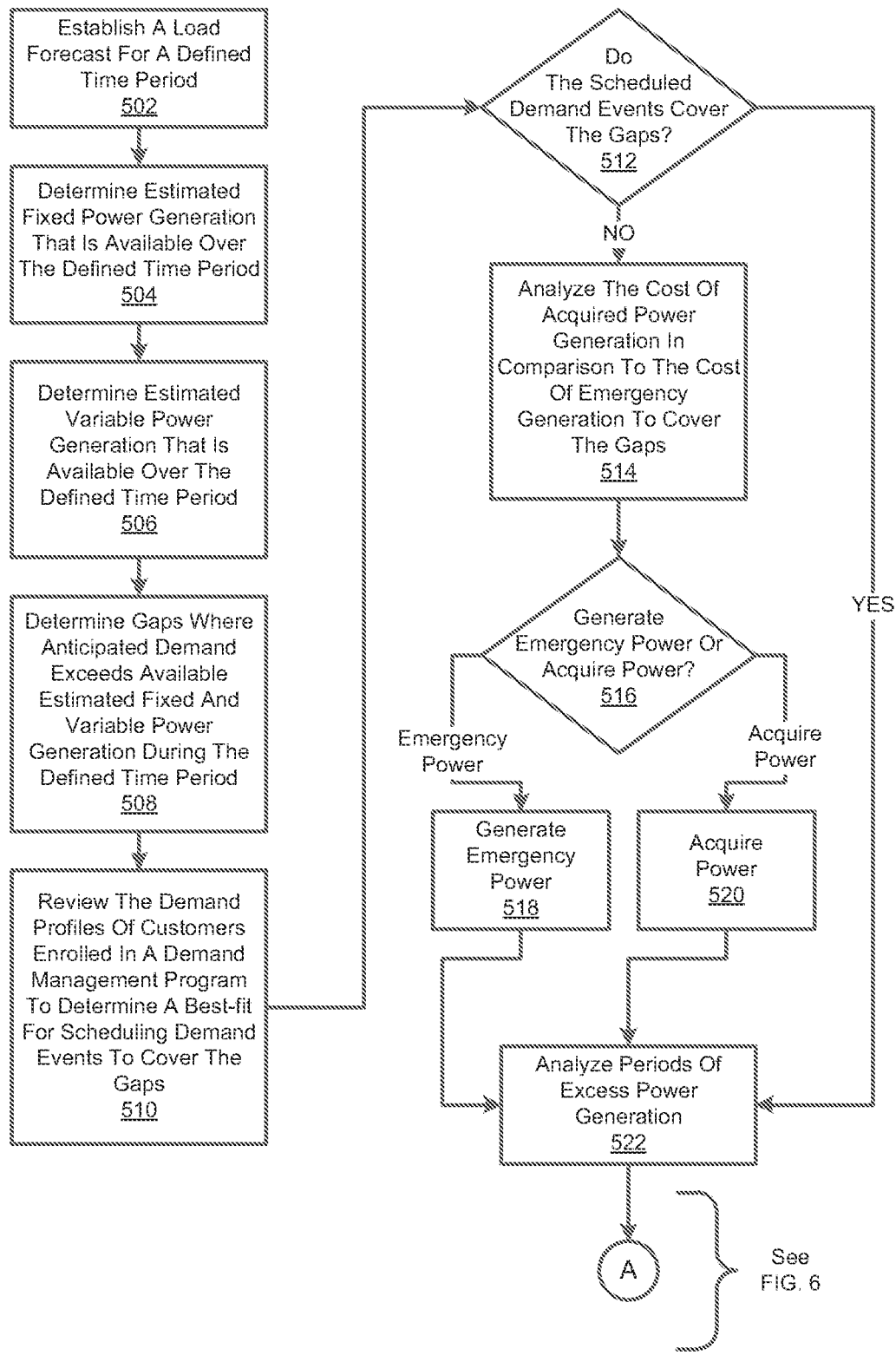
FIG. 5 is a detailed flowchart illustrating another embodiment of a method of the present invention.
Figure 6:
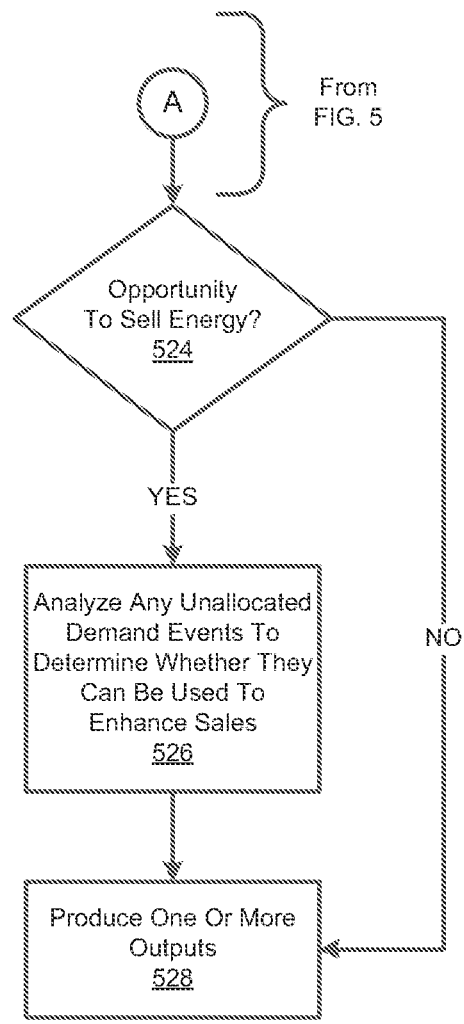
FIG. 6 is a continuation of FIG. 5.

FIG. 5 is a detailed flowchart illustrating another embodiment of a method of the present invention. At step 502, a load forecast is established for a defined time period. The load forecast provides an estimation of power consumption over the time period. In one aspect, the load forecast is provided by a load forecasting and profiling system 204 that includes individual customer usage information as well as projected usage information over a specified time period, as described herein. At step 504, estimated fixed power generation that is available over the time period is determined. Both, an amount and costs for the estimated fixed power generation is determined at step 504. Known events such as scheduled maintenance are taken into consideration at this step, as well as the probability of unknown events such as forced outages. At step 506, an amount and costs for variable power generation that is available over the time period is determined. Because some variable power generation is weather dependent (e.g., solar, wind, etc.), a weather forecast for the time period can be used to calculate a probability distribution of the variable power generation over the time period. At step 508, gaps are determined where anticipated demand from the load forecasts exceeds total estimated available fixed and variable power generation. At step 510, the demand profiles of customers enrolled in a demand management program are reviewed to determine a best-fit for scheduling demand events to cover the gaps. At step 512, it is determined whether the demand events "cover" or eliminate the gaps between anticipated demand and total estimated available fixed and variable power generation. If the demand events do cover the gaps, then the process goes to step 522, else the process goes to step 514. At step 514, the cost of acquired power generation is analyzed in comparison to the cost of emergency generation in order to cover the gaps. At 516, it is determined whether it is more efficient to acquire power or to generate emergency power. If, at step 516, it is determined that it is more efficient to generate emergency power, then at step 518, emergency power is generated in order to cover the gaps. If, at step 516, it is determined that it is more efficient to acquire electrical energy, then at step 520 electrical energy is acquired in order to cover the gaps. At step 522, periods of excess power generation are analyzed. These are periods (during the defined time period) when generation (whether fixed, variable, emergency or acquired) exceeds anticipated demand from the load forecasts. At step 524, it is determined whether there are opportunities to sell any excess generation as determined in step 522. If so, then at step 526 any unallocated demand events for the determined time period are analyzed to see whether they can be used to enhance an ability to sell energy. This analysis can involve analyzing current and future energy sales markets to determine if the sale price exceeds the cost of generation. If so, then any remaining demand events can be utilized to maximize the amount of electrical energy that is available for sale. If, at step 524 it is determined that there are not any opportunities to sell excess energy, then the process goes to step 528. At step 528, one or more outputs are produced. In one aspect, the outputs comprise one or more reports. In one aspect, the one or more reports comprise one or more of a report of a best fit use of the demand events using the internal power generation, a report on a best fit use of the demand events using the internal generation and the acquired power availability, a report on opportunities for the utility to sell the internal power generation or the acquired power availability, or a report on the best fit of demand events using any combination of generated and/or acquired power. In one aspect, the outputs comprise one or more control signals for controlling the demand events over the time period based on differences between the estimated power availability and the estimated power consumption at various points during the time period.

The above system has been described above as comprised of units. One skilled in the art will appreciate that this is a functional description and that software, hardware, or a combination of software and hardware can perform the respective functions. A unit, such as computing device 108, meter 106, DRMS 202, load forecasting and profiling system 204, power generation and acquisition system 206, weather forecasting system 208, etc., can be software, hardware, or a combination of software and hardware. The units can comprise the demand event scheduling software 706 as illustrated in FIG. 7 and described below. In one exemplary aspect, the units can comprise a computing device 108 as referenced above and further described below.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, SCADA masters, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a computing device 108. The components of the computing device 108 can comprise, but are not limited to, one or more processors or processing units 703, a system memory 712, and a system bus 713 that couples various system components including the processor 703 to the system memory 712. In the case of multiple processing units 703, the system can utilize parallel computing. In one aspect, the processor 703 is configured to establish a defined time period; estimate power availability over the time period; estimate power consumption over the time period; and schedule demand events stored in the memory 712 over the time period based on differences between the estimated power availability and the estimated power consumption at various points during the time period.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, demand event scheduling software 706, demand event scheduling data 707, a network adapter 708, system memory 712, an Input/Output Interface 710, a display adapter 709, a display device 711, and a human machine interface 702, can be contained within one or more remote computing devices or clients 714a,b,c at physically separate locations, connected through buses of this form, in effect implementing a fully distributed system or distributed architecture.

The computing device 108 typically comprises a variety of computer readable media. Exemplary readable media can be any available media that is non-transitory and accessible by the computing device 108 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as phase identification data 707 and/or program modules such as operating system 705 and demand event scheduling software 706 that are immediately accessible to and/or are presently operated on by the processing unit 703. In one aspect, the system memory 712 contains computer executable codes sections for performing the steps of causing a signal to be transmitted to adjust one or more operational characteristics of an electrical device; receiving information about changes in at least one electrical parameter of one or more phases of a poly-phase electrical system that provides electrical energy to the electrical device; correlating the changes in the at least one electrical parameter of the one or more phases of the poly-phase electrical system that provides electrical energy to the electrical device with the adjustment of the one or more operational characteristics of the electrical device; and identifying the one or more phases of the poly-phase electrical system that provide electrical energy to the electrical device based upon the correlation of the changes in the at least one electrical parameter of the one or more phases of the poly-phase electrical system that provides electrical energy to the electrical device with the adjustment of the one or more operational characteristics of the electrical device.

In another aspect, the computing device 108 can also comprise other non-transitory, removable/non-removable, volatile/non-volatile computer storage media. By way of example, FIG. 7 illustrates a mass storage device 704 that can provide non-volatile storage of computer code, computer readable instructions, data structures, program modules, and other data for the computing device 108. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and demand event scheduling software 706. Each of the operating system 705 and demand event scheduling software 706 (or some combination thereof) can comprise elements of the programming and the demand event scheduling software 706. Demand event scheduling data 707 can also be stored on the mass storage device 704. Demand event scheduling data 707 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 108 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 108 can have more than one display adapter 709 and the computing device 108 can have more than one display device 711. For example, a display device can be a monitor, an LCD (Liquid Crystal Display), or a projector. In addition to the display device 711, other output peripheral devices can comprise components such as speakers (not shown) and a printer (not shown), which can be connected to the computer 108 via Input/Output Interface 710. Any step and/or result of the methods can be output in any form to an output device. Such output can be any form of visual representation, including, but not limited to, textual, graphical, animation, audio, tactile, and the like.

The computing device 108 can operate in a networked environment using logical connections to one or more remote computing devices or clients 714a,b,c. By way of example, a remote computing device 714 can be a personal computer, portable computer, a server, a router, a network computer, a smart meter, a vendor or manufacture's computing device, smart grid components, a SCADA master, a DRMS processor, a DMS processor, a peer device or other common network node, and so on and can be in support of one or more of DRMS 202, load forecasting and profiling system 204, power generation and acquisition system 206, weather forecasting system 208, etc. Logical connections between the computing device 108 and a remote computing device or client 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 715 such as the Internet, an AMI network, or the like.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of demand event scheduling software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 7, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., one or more processors 703 of FIG. 7) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   establishing a defined time period;
   estimating power availability over the time period;
   estimating power consumption over the time period; and
   scheduling, using a computing device, demand events over the time period based on differences between the estimated power availability and the estimated power consumption at various points during the time period, wherein the demand events comprises an authorized reduction of electrical service of an electrical power consumer.

2. The method of claim 1, wherein estimating power availability over the time period comprises estimating internal power generation controlled by a utility and estimating acquired power availability that can be purchased from sources not controlled by the utility over the time period.

3. The method of claim 2, wherein the internal power generation controlled by the utility includes fixed power generation and variable power generation.

4. The method of claim 3, wherein estimating internal power generation controlled by the utility comprises estimating an amount and a cost for the fixed power generation and an amount and a cost for the variable power generation.

5. The method of claim 4, wherein a weather forecast for the defined time period is used to estimate the amount and the cost of the variable power generation.

6. The method of claim 3, wherein the variable power generation comprises one or more of wind generation, solar generation, hydroelectric generation, pumped-storage generation, steam-turbine generation and combustion-turbine generation.

7. The method of claim 3, wherein the fixed power generation comprises one or more of nuclear generation, coal-fired generation, oil-fired generation, and natural-gas fired generation.

8. The method of claim 3, wherein scheduling demand events over the time period based on differences between the estimated power availability and the estimated power consumption at various points during the time period comprises scheduling the demand events to maximize revenue for the utility by scheduling a sale of estimated power availability that exceeds estimated power consumption and scheduling the demand events to minimize costs to the utility by minimizing purchases of acquired power generation when the cost of acquired power generation exceeds the cost of internal power generation and minimizes the use of variable power generation when the cost of variable power generation exceeds the cost of fixed power generation.

9. The method of claim 3, wherein scheduling demand events over the time period based on differences between the estimated power availability and the estimated power consumption at various points during the time period comprises scheduling the demand events to maximize revenue from sales of power by the utility over the time period and minimizing costs of fixed power generation, variable power generation and acquired power generation to the utility over the time period.

10. The method of claim 2, further comprising generating, by the computing device, one or more reports based on scheduling the demand events over the time period based on differences between the estimated power availability and the estimated power consumption at various points during the time period.

11. The method of claim 10, wherein the one or more reports comprise one or more of a report of a best fit use of the demand events using the internal power generation, a report on a best fit use of the demand events using the internal generation and the acquired power availability, and a report on opportunities for the utility to sell the internal power generation or the acquired power availability.

12. The method of claim 1, further comprising generating, by the computing device, one or more control signals for controlling the demand events over the time period based on differences between the estimated power availability and the estimated power consumption at various points during the time period.

13. The method of claim 1, wherein establishing a defined time period comprises establishing a time period of one hour, one day, one week, one month, one year, two years, five years, ten years, or any period of time therebetween.

14. The method of claim 1, wherein estimating power consumption over the time period comprises determining a load profile for each of a plurality of electrical power consumers over the time period and aggregating the plurality of load profiles.

15. The method of claim 14, wherein determining the load profiles for each of the plurality of electrical power consumers over the time period comprises determining the load profiles of residential, commercial and industrial consumers of electrical power over the time period.

16. The method of claim 14, wherein the demand event comprises a utility having authorization to discontinue electrical power service to all or part of an electrical load of one of the plurality of electrical power consumers for a predetermined duration and scheduling demand events over the time period based on differences between the estimated power availability and the estimated power consumption at various points during the time period comprises scheduling the demand events to decrease the estimated power consumption or increase the estimated power availability.

17. A system comprised of:
a memory; and
a processor operably connected with the memory, wherein the processor is configured to:
establish a defined time period, wherein at least a portion of the time period occurs at a future time;
estimate power availability over the time period;
estimate power consumption over the time period; and
schedule demand events stored in the memory over the time period based on differences between the estimated power availability and the estimated power consumption at various points during the time period.

18. The system of claim 17, wherein the processor is configured to estimate power availability over the time period comprises the processor configured to estimate internal power generation controlled by a utility and estimate acquired power availability that can be purchased from sources not controlled by the utility over the time period.

19. The system of claim 18, wherein the internal power generation controlled by the utility includes fixed power generation and variable power generation.

20. The system of claim 19, wherein the processor is configured to estimate internal power generation controlled by the utility comprises the processor configured to estimate an amount and a cost for the fixed power generation and an amount and a cost for the variable power generation.

21. The system of claim 20, wherein the processor is configured to use a weather forecast for the defined time period to estimate the amount and the cost of the variable power generation.

22. The system of claim 19, wherein the variable power generation comprises one or more of wind generation, solar generation, hydroelectric generation, pumped-storage generation, steam-turbine generation and combustion-turbine generation.

23. The system of claim 19, wherein the fixed power generation comprises one or more of nuclear generation, coal-fired generation, oil-fired generation, and natural-gas fired generation.

24. The system of claim 19, wherein the processor is configured to schedule demand events over the time period based on differences between the estimated power availability and the estimated power consumption at various points during the time period comprises the processor configured to schedule the demand events to maximize revenue for the utility by scheduling a sale of estimated power availability that exceeds estimated power consumption and scheduling the demand events to minimize costs to the utility by minimizing purchases of acquired power generation when the cost of acquired power generation exceeds the cost of internal power generation and minimizes the use of variable power generation when the cost of variable power generation exceeds the cost of fixed power generation.

25. The system of claim 19, wherein the processor is configured to schedule demand events over the time period based on differences between the estimated power availability and the estimated power consumption at various points during the time period comprises the processor configured to schedule the demand events to maximize revenue from sales of power by the utility over the time period and minimizing costs of fixed power generation, variable power generation and acquired power generation to the utility over the time period.

26. The system of claim 18, wherein the processor is further configured to generate one or more reports based on scheduling the demand events over the time period based on differences between the estimated power availability and the estimated power consumption at various points during the time period.

27. The system of claim 26, wherein the one or more reports comprise one or more of a report of a best fit use of the demand events using the internal power generation, a report on a best fit use of the demand events using the internal generation and the acquired power availability, and a report on opportunities for the utility to sell the internal power generation or the acquired power availability.

28. The system of claim 17, wherein the processor is further configured to generate one or more control signals for controlling the demand events over the time period based on differences between the estimated power availability and the estimated power consumption at various points during the time period.

29. The system of claim 17, wherein the processor is configured to establish a defined time period comprises the processor configured to establish a time period of one hour, one day, one week, one month, one year, two years, five years, ten years, or any period of time therebetween.

30. The system of claim 17, wherein the processor is configured to estimate power consumption over the time period comprises the processor configured to aggregate a load profile for each of a plurality of electrical power consumers over the time period.

31. The system of claim 17, wherein the load profiles for each of a plurality of electrical power consumers comprises load profiles of residential, commercial and industrial consumers of electrical power over the time period.

32. The system of claim 31, wherein the demand event comprises a utility having authorization to discontinue electrical power service to all or part of an electrical load of one of the plurality of electrical power consumers for a predetermined duration and the processor is configured to schedule demand events over the time period based on differences between the estimated power availability and the estimated power consumption at various points during the time period comprises the processor configured to schedule the demand events to decrease the estimated power consumption or increase the estimated power availability.

33. A computer program product comprised of computer-executable code on a non-transitory computer-readable medium, said computer-executable code for performing the steps of:
establishing a defined time period;
estimating power availability over the time period, wherein estimating power availability over the time period comprises estimating internal power generation controlled by a utility and estimating acquired power availability that can be purchased from sources not controlled by the utility over the time period, and wherein the internal power generation controlled by the utility includes fixed power generation and variable power generation;
estimating power consumption over the time period based at least in part on measurements taken from one or more electricity meters; and
scheduling, using a computing device, demand events over the time period based on differences between the estimated power availability and the estimated power consumption at various points during the time period, wherein the one or more electricity meters are configured to implement demand events.

34. The computer program product of claim 33, wherein estimating internal power generation controlled by the utility comprises estimating an amount and a cost for the fixed power generation and an amount and a cost for the variable power generation, and wherein a weather forecast for the defined time period is used to estimate the amount and the cost of the variable power generation.

35. The computer program product of claim 33, further comprising generating, by the computing device, one or more reports based on scheduling the demand events over the time period based on differences between the estimated power availability and the estimated power consumption at various points during the time period, wherein the one or more reports comprise one or more of a report of a best fit use of the demand events using the internal power generation, a report on a best fit use of the demand events using the internal generation and the acquired power availability, and a report on opportunities for the utility to sell the internal power generation or the acquired power availability.

36. The computer program product of claim 33, wherein scheduling demand events over the time period based on differences between the estimated power availability and the estimated power consumption at various points during the time period comprises scheduling the demand events to maximize revenue for the utility by scheduling a sale of estimated power availability that exceeds estimated power consumption and scheduling the demand events to minimize costs to the utility by minimizing purchases of acquired power generation when the cost of acquired power generation exceeds the cost of internal power generation and minimizes the use of variable power generation when the cost of variable power generation exceeds the cost of fixed power generation.

37. The computer program product of claim 33, wherein scheduling demand events over the time period based on differences between the estimated power availability and the estimated power consumption at various points during the time period comprises scheduling the demand events to maximize revenue from sales of power by the utility over the time period and minimizing costs of fixed power generation, variable power generation and acquired power generation to the utility over the time period.

* * * * *